(12) United States Patent
Peng et al.

(10) Patent No.: US 8,862,778 B2
(45) Date of Patent: Oct. 14, 2014

(54) METHOD AND TERMINAL FOR IMPROVING DOMAIN NAME RESOLUTION EFFICIENCY

(75) Inventors: Kai Peng, Shenzhen (CN); Jianying Gao, Shenzhen (CN); Hui Li, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/505,594

(22) PCT Filed: Sep. 3, 2010

(86) PCT No.: PCT/CN2010/076602
§ 371 (c)(1),
(2), (4) Date: May 2, 2012

(87) PCT Pub. No.: WO2011/143869
PCT Pub. Date: Nov. 24, 2011

(65) Prior Publication Data
US 2013/0060965 A1    Mar. 7, 2013

(30) Foreign Application Priority Data

May 20, 2010 (CN) .......................... 2010 1 0179685

(51) Int. Cl.
*G06F 15/16* (2006.01)
*H04L 29/12* (2006.01)
(52) U.S. Cl.
CPC ........ *H04L 61/1511* (2013.01); *H04L 61/6086* (2013.01); *H04L 29/12971* (2013.01); *H04L 29/12066* (2013.01)
USPC ....................................................... 709/245
(58) Field of Classification Search
CPC .................. H04L 29/12066; H04L 29/12132; H04L 61/1552

USPC ......................................................... 709/245
See application file for complete search history.

(56) References Cited

U.S. PATENT DOCUMENTS

| | | | |
|---|---|---|---|
| 7,315,543 B2 * | 1/2008 | Takeuchi et al. | 370/392 |
| 7,472,201 B1 | 12/2008 | Aitken | |
| 2008/0273461 A1* | 11/2008 | Liang et al. | 370/235 |

FOREIGN PATENT DOCUMENTS

| | | |
|---|---|---|
| CN | 1773988 A | 5/2006 |
| CN | 1842055 A | 10/2006 |
| CN | 101087253 A | 12/2007 |
| CN | 101483635 A | 7/2009 |

OTHER PUBLICATIONS

International Search Report for PCT/CN2010/076602 dated Feb. 12, 2011.

* cited by examiner

*Primary Examiner* — Yves Dalencourt
(74) *Attorney, Agent, or Firm* — Ling Wu; Stephen Yang; Ling and Yang Intellectual Property

(57) ABSTRACT

A method and terminal for improving domain name resolution efficiency is provided. The method is implemented in a terminal supporting IPv4/IPv6 dual stack and comprises: the terminal initiating a domain name resolution request to a domain name system server (S11); and when obtaining a normal response, the terminal recording a first format corresponding to the initiated domain name resolution request as a default initiation format of the current domain name resolution request (S12). The method and terminal provided herewith are used to adapt network environments dynamically to a certain extent so as to increase the domain name request efficiency, thereby improve the fluency for the entire service access.

6 Claims, 2 Drawing Sheets

METHOD AND TERMINAL FOR IMPROVING DOMAIN NAME RESOLUTION EFFICIENCY

TECHNICAL FIELD

The present invention relates to a communication network system, and in particular, to a method and a terminal for improving domain name resolution efficiency in the environment of Internet Protocol version 4 (IPv4)/Internet Protocol version 6 (IPv6) dual stack.

BACKGROUND OF THE RELATED ART

Although IPv6 has not yet been used in large scale at present, with the fast lack of global IP addresses and business requirements, the rapid development and gradual popularization of IPv6 have become inevitable. But how to transition to IPv6 is also an important subject, and a IPv4/IPv6 dual stack mode is one of common transition mechanisms.

For the dual stack mode, selection of IP modes is involved inevitably when a terminal initiates services, and in general, services are accessed using a domain name mode, so domain name resolution becomes a key point.

In a scene of IPv4 and IPv6 dual stack, there will be two DNS (Domain Name System) resolution request modes, mode A and mode AAAA when a terminal initiates a domain name request. The mode A corresponds to a request in an IPv4 address format and the mode AAAA corresponds to a request in an IPv6 address format.

On this premise, when a dual stack terminal accesses to a domain name, a strategy for sending DNS resolution requests generally is to constantly and continuously make the requests using the two modes, i.e. first the mode A then the mode AAAA, or vice versa. Since an IP address mode corresponding to a domain name in a reality scene in network environment is relatively fixed, one of two continuous requests made in the two modes will generally fail. If the service to be accessed only supports IPv6 addresses, a domain name server will certainly fail to respond to the first DNS resolution request in the mode A, and will respond correctly, with an IPv6 address format, to the second DNS resolution request in the mode AAAA initiated by the dual stack terminal. So when the dual stack terminal accesses to IPv6 services, the efficiency will be affected. On the contrary, if the DNS requests are always made in the mode AAAA first and then in the mode A, then the effect is not ideal when IPv4 services are accessed.

CONTENT OF THE INVENTION

A technical problem to be solved by the present invention is to provide a method and a terminal for improving domain name resolution efficiency to improve domain name request efficiency.

In order to solve the technical problem mentioned above, the present invention provides a method for improving domain name resolution efficiency, which is implemented in a terminal supporting IPv4/IPv6 dual stack and comprises:

the terminal initiating a domain name resolution request to a domain name system server; and when obtaining a normal response, the terminal recording a first format corresponding to the initiated domain name resolution request as a default initiation format of the current domain name resolution request.

The method further comprises when obtaining an abnormal response to the domain name resolution request initiated in the default initiation format, the terminal initiating a domain resolution request in a second format and changing the default initiation format of the current domain name resolution request into the second format.

The method further has the following features:

the first format and the second format are respectively one of format A and format AAAA, the format A corresponding to an IPv4 address format and the format AAAA corresponding to an IPv6 address format.

In order to solve the abovementioned technical problem, the present further provides a terminal supporting IPv4/IPv6 dual stack comprising:

an application module configured to trigger a domain name resolution module when application services requiring domain name resolution are activated; and the domain name resolution module configured to initiate a domain name resolution request to a domain name system server, and record a first format corresponding to the initiated domain name resolution request as a default initiation format of the current domain name resolution request when obtaining a normal response.

The terminal further has the following features:

the domain name resolution module is further configured to, when obtaining an abnormal response to the domain name resolution request initiated in the default initiation format, initiate a domain resolution request in a second format and change the default initiation format of the current domain name resolution request into the second format.

The terminal further has the following features: the domain name resolution module comprises:

a message processing sub-module configured to obtain a domain name resolution request format from a strategy control sub-module after receiving trigger information of the application module, and encapsulate a domain name resolution request message using the obtained domain name resolution request format to send to the domain name system server; and if receiving a normal response message returned by the domain name system server, resolve a corresponding IP address from the normal response message, send the IP address to the application module and notify the strategy control sub-module; and a strategy control sub-module configured to maintain a domain name resolution request strategy and provide the currently used domain name resolution request format to the message processing sub-module; and record the first format corresponding to the initiated domain name resolution request as the default initiation format of the current domain name resolution request after receiving the notification.

The terminal further has the following features:

the message processing sub-module is further configured to obtain the second format from the strategy control sub-module if receiving the abnormal response message returned by the domain name system server, and encapsulate the domain name resolution request message in the second format to send to the domain name system server; and the strategy control sub-module is further configured to change the default initiation format of the current domain name resolution request into the second format after providing the second format to the message processing sub-module.

The terminal further has the following features:

the first format and the second format are respectively one of format A and format AAAA, the format A corresponding to an IPv4 address format and the format AAAA corresponding to an IPv6 address format.

In summary, the method and the terminal for improving domain name resolution efficiency in accordance with the present invention are used to adapt network environments dynamically to a certain extent so as to increase the domain name request efficiency, thereby improving the fluency for the entire service access.

BRIEF DESCRIPTION OF DRAWINGS

The accompanying drawings illustrated herein used to provide further understanding of the present invention constitute part of the present application, and exemplary embodiments of the present invention and the description thereof used to explain the present invention are not intended to inappropriately limit the present invention. In the drawings.

PREFERRED EMBODIMENTS OF THE PRESENT INVENTION

The technical scheme of the present invention will be further described in detail hereinafter in conjunction with the accompanying drawings and the embodiments.

Figure 1:
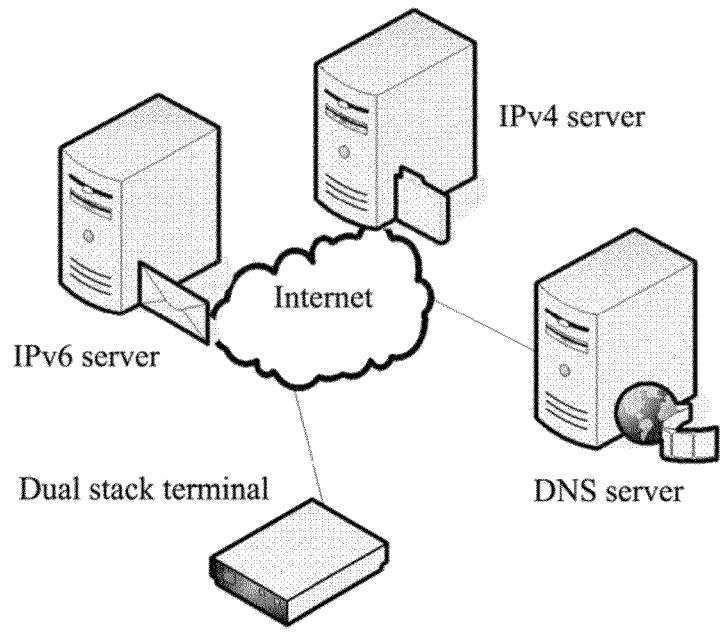
FIG. 1 is an application networking diagram in accordance with the present invention.

FIG. 1 is an application networking diagram in accordance with the present invention. As shown in the figure, a terminal supporting IPv4/IPv6 dual stack can access to an IPv4 server or IPv6 server after performing domain name resolution via a DNS server.

Figure 2:
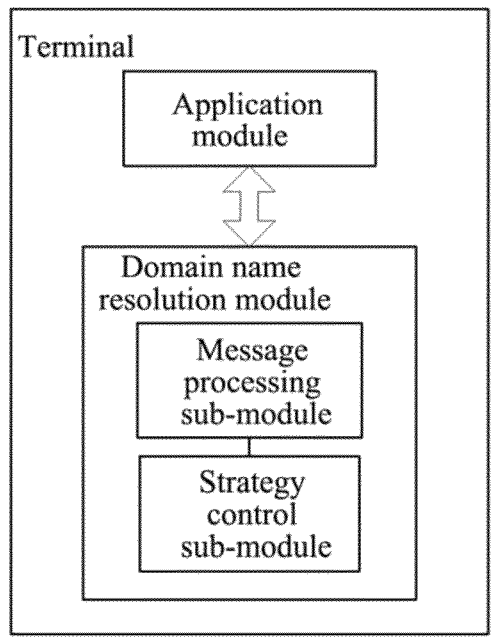
FIG. 2 is a schematic diagram of a terminal in accordance with the present invention.

In this IPv4/IPv6 dual stack environment, in order to improve domain name resolution efficiency when the terminal accesses to a network for service access, the present invention provides a terminal supporting IPv4/IPv6 dual stack, which, as shown in FIG. 2, comprises an application module and a domain name resolution module.

The application module is configured to trigger the domain name resolution module when application services requiring domain name resolution are activated.

There are many application services requiring domain name resolution, such as SNTP (time services), VOIP (voice phone), TR069 (network management), IPTV (multicast and on demand), etc. Interaction between each application and a server may be a domain name mode.

The application module transmits a domain name address required to be accessed to the domain name resolution module when triggering the domain name resolution module.

The domain name resolution module is configured to initiate domain name resolution request, and record a first format corresponding to the initiated domain name resolution request as a default initiation format of the current domain name resolution request when obtaining a normal response.

Further, when obtaining an abnormal response to the domain name resolution request initiated in the default initiation format, the domain name resolution module initiates a domain resolution request in a second format and changes the default initiation format of the current domain name resolution request into the second format.

The first format and second format are respectively one of format A and format AAAA, the format A corresponding to an IPv4 address format and the format AAAA corresponding to an IPv6 address format. If the first format is the format A, then the second format is the format AAAA; and if the first format is the format AAAA, then the second format is the format A.

The domain name resolution module may comprise a message processing sub-module and a strategy control sub-module.

The a message processing sub-module is configured to obtain a domain name resolution request format from a strategy control sub-module after receiving trigger information of the application module, and encapsulate a domain name resolution request message using the obtained domain name resolution request format to send to the DNS server; and if receiving a normal response message returned by the DNS server, resolve a corresponding IP address from the normal response message, send the IP address to the application module and notify the strategy control sub-module.

The strategy control sub-module is configured to maintain a domain name resolution request strategy and provide the currently used domain name resolution request format to the message processing sub-module; and record the first format corresponding to the initiated domain name resolution request as the default initiation format of the current domain name resolution request after receiving the notification.

Further, the message processing sub-module is also configured to obtain the second format from the strategy control sub-module if receiving the abnormal response message returned by the DNS server, and encapsulate the domain name resolution request message in the second format to send to the DNS server.

The strategy control sub-module is further configured to change the default initiation format of the current domain name resolution request into the second format after providing the second format to the message processing sub-module.

Figure 3:
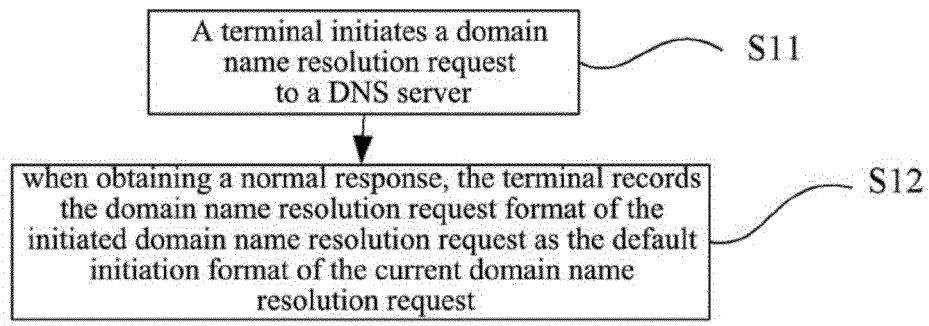
FIG. 3 is a flowchart of a method for improving domain name resolution efficiency in accordance with of the present invention.

The present invention also provides a method for improving domain name resolution efficiency using the terminal described above, which, as shown in FIG. 3, comprises the following steps.

In S11, the terminal initiates a domain name resolution request to a DNS server.

For example, the terminal initiates the domain name resolution request to the DNS server when activating a certain particular application service.

In S12, upon obtaining a normal response, the terminal records the domain name resolution request format of the initiated domain name resolution request as the default initiation format of the current domain name resolution request.

The domain name resolution request format of the initiated domain name resolution request may be format A or format AAAA.

Thus, when a new request is initiated again next time, the default initiation format is used preferentially, and requests are not initiated in the two formats continuously in a fixed order. When there is no normal response to a certain domain name resolution request, a request in another mode is initiated and at the same time a new default initiation format of the domain name request is switched to. Such a strategy of dynamically adjusting the domain name request initiation mode instead of making the request constantly in a certain order is used to adapt network environments dynamically to a certain extent so as to increase the domain name request efficiency, thereby improving the fluency for the entire service access.

Figure 4:
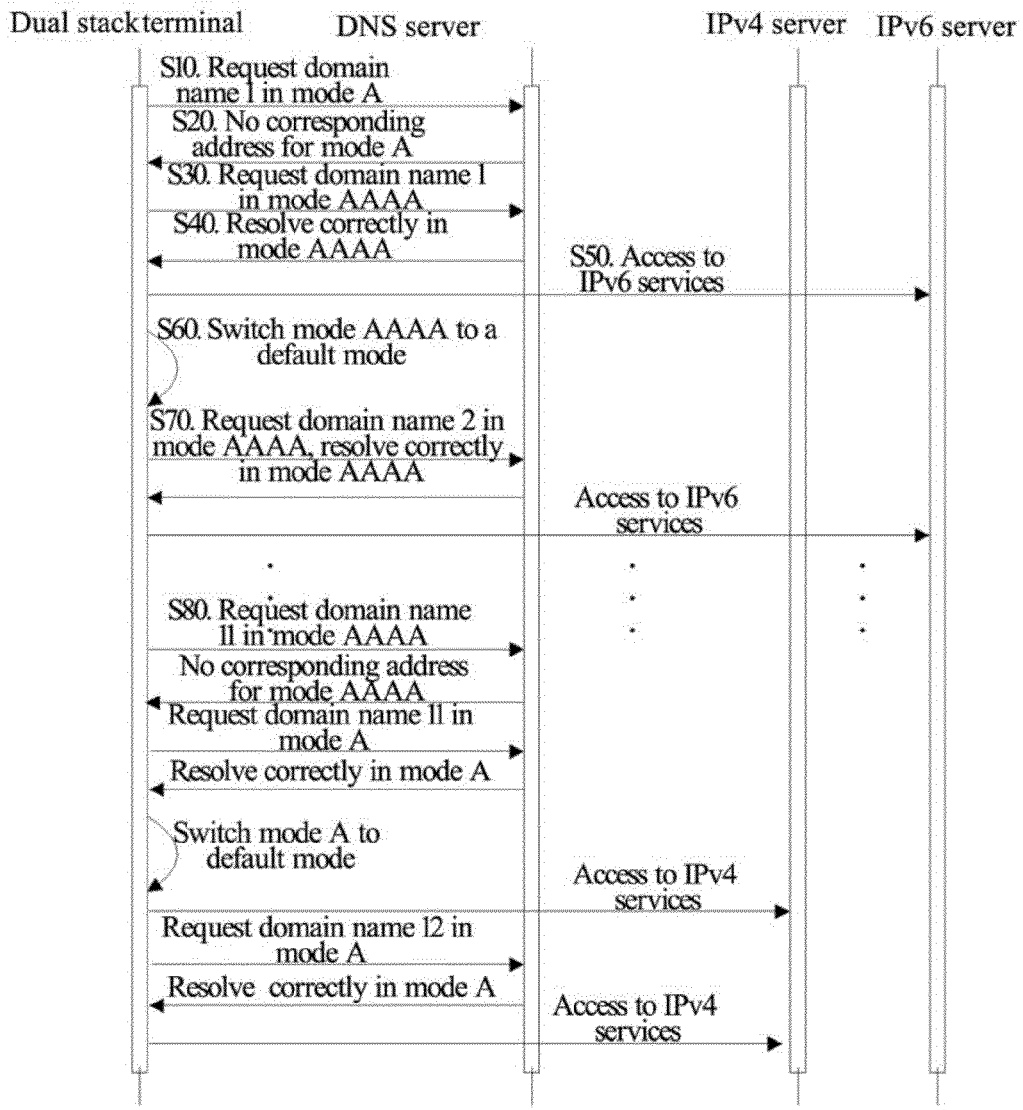
FIG. 4 is a flowchart of an embodiment of the method for improving the domain name resolution efficiency in accordance with the present invention.

Referring to FIG. 4 hereinafter, a particular embodiment of a method for improving domain name resolution efficiency in accordance with the present invention will be described in detail. As an example, a terminal accesses to a network and selects a domain name request mode flexibly and dynamically so as to improve service access efficiency.

On the premise that a domain name of the terminal is resolved using the mode A preferentially and a domain name of the service to be accessed is in an IPv6 network accordingly, implementation steps are as follows.

In S10, a dual stack terminal initiates a domain name resolution request message in the mode A to request to resolve an IP address of domain name 1.

In S20, a DNS server makes a query and finds no corresponding record, it then responds to the terminal with no IPv4 address.

In S30, the dual stack terminal initiates a domain name resolution request message in the mode AAAA to request to resolve the IP address of the domain name 1.

In S40, the DNS server finds the corresponding record, indicating that the resolution is successful, and responds to the terminal with an IPv6 address.

In S50, the dual stack terminal accesses to services using the IPv6 address.

In S60, the dual stack terminal saves the mode AAAA as a preferential domain name request format.

In S70, when the next domain name resolution request is required, the domain name resolution request is initiated preferentially using the mode AAAA.

In S80, when a domain name request in the mode AAAA cannot be resolved correctly, the dual stack terminal will initiate a request in the mode A while switching the mode A to the preferential domain name request format.

The method for improving domain name resolution efficiency in accordance with the present invention has the following advantages: services are accessed mostly in a domain name mode, and improving performance of domain name resolution has universality for improvement of the entire service access efficiency; dynamic adjustment of the DNS request mode can flexibly adapt to service access of various networks; and the strategy is simple and practical, and the cost is low.

Although the preferred embodiments of the present invention have been disclosed for exemplary purpose, it will be recognized by those skilled in the art that various modifications, additions and substitutions are possible, thus the range of the present invention should not be limited to the embodiments described above.

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

INDUSTRIAL APPLICABILITY

The method and the terminal for improving domain name resolution efficiency in accordance with the present invention are used to adapt network environments dynamically to a certain extent so as to increase the domain name request efficiency, thereby improving the fluency for the entire service access.

What we claim is:

1. A method for improving domain name resolution efficiency, which is implemented in a terminal supporting Internet Protocol version 4 (IPv4)/Internet Protocol version 6 (IPv6) dual stack and comprises:

by a terminal that supports both IPv4 and IPv6, a domain name resolution request to a domain name system server (DNS server); and when said terminal obtaining a normal response from the DNS server, recording, by the terminal that supports both IPv4 and IPv6, a first format corresponding to the initiated domain name resolution request as a default initiation format of the current domain name resolution request;

when said terminal obtaining an abnormal response to the domain name resolution request initiated in the default initiation format, initiating, by the terminal that supports both IPv4 and IPv6, a domain resolution request in a second format and changing the default initiation format of the current domain name resolution request into the second format;

wherein the normal response is the response from the DNS server to the terminal that include an IP address from a successful resolution of the domain name as requested; and the abnormal response is the response from the DNS server to said terminal that does not includes an IP address from a successful resolution of the domain name as requested and when the DNS server does not respond to the terminal.

2. The method according to claim 1, wherein:

the first format and the second format are respectively one of format A and format AAAA, the format A corresponding to an IPv4 address format and the format AAAA corresponding to an IPv6 address format.

3. A terminal supporting Internet Protocol version 4 (IPv4)/Internet Protocol version 6 (IPv6) dual stack comprising:

a processor and a storage device, wherein the storage device stores following modules to be executed by the processor:

an application module configured to trigger a domain name resolution module when application services requiring domain name resolution are activated; and the domain name resolution module configured to initiate a domain name resolution request to a domain name system server, and record a first format corresponding to the initiated domain name resolution request as a default initiation format of the current domain name resolution request when obtaining a normal response, and the domain name resolution module is further configured to, when obtaining an abnormal response to the domain name resolution request initiated in the default initiation format, initiate a domain resolution request in a second format and change the default initiation format of the current domain name resolution request into the second format;

wherein the normal response is the response from the DNS server to the terminal that includes an IP address from a successful resolution of the domain name as requested; and the abnormal response is the response from the DNS server to said terminal that does not include an IP address from a successful resolution of the domain name as requested and when the DNS server does not respond to the terminal.

4. The terminal according to claim 3, wherein the domain name resolution module comprises:
- a message processing sub-module configured to obtain a domain name resolution request format from a strategy control sub-module after receiving trigger information of the application module, and encapsulate a domain name resolution request message using the obtained domain name resolution request format to send to the domain name system server; and if receiving a normal response message returned by the domain name system server, resolve a corresponding IP address from the normal response message, send the IP address to the application module and notify the strategy control sub-module; and
- the strategy control sub-module configured to maintain a domain name resolution request strategy and provide the currently used domain name resolution request format to the message processing sub-module; and record the first format corresponding to the initiated domain name resolution request as the default initiation format of the current domain name resolution request after receiving the notification.

5. The terminal according to claim 4, wherein the message processing sub-module is further configured to obtain the second format from the strategy control sub-module if receiving the abnormal response message returned by the domain name system server, and encapsulate the domain name resolution request message in the second format to send to the domain name system server; and the strategy control sub-module is further configured to change the default initiation format of the current domain name resolution request into the second format after providing the second format to the message processing sub-module.

6. The terminal according to claim 3, wherein the first format and the second format are respectively one of format A and format AAAA, the format A corresponding to an IPv4 address format and the AAAA corresponding to an IPv6 address format.

* * * * *